April 19, 1932. G. McGILTON 1,854,270
RENDERING METHOD
Filed Nov. 6, 1930
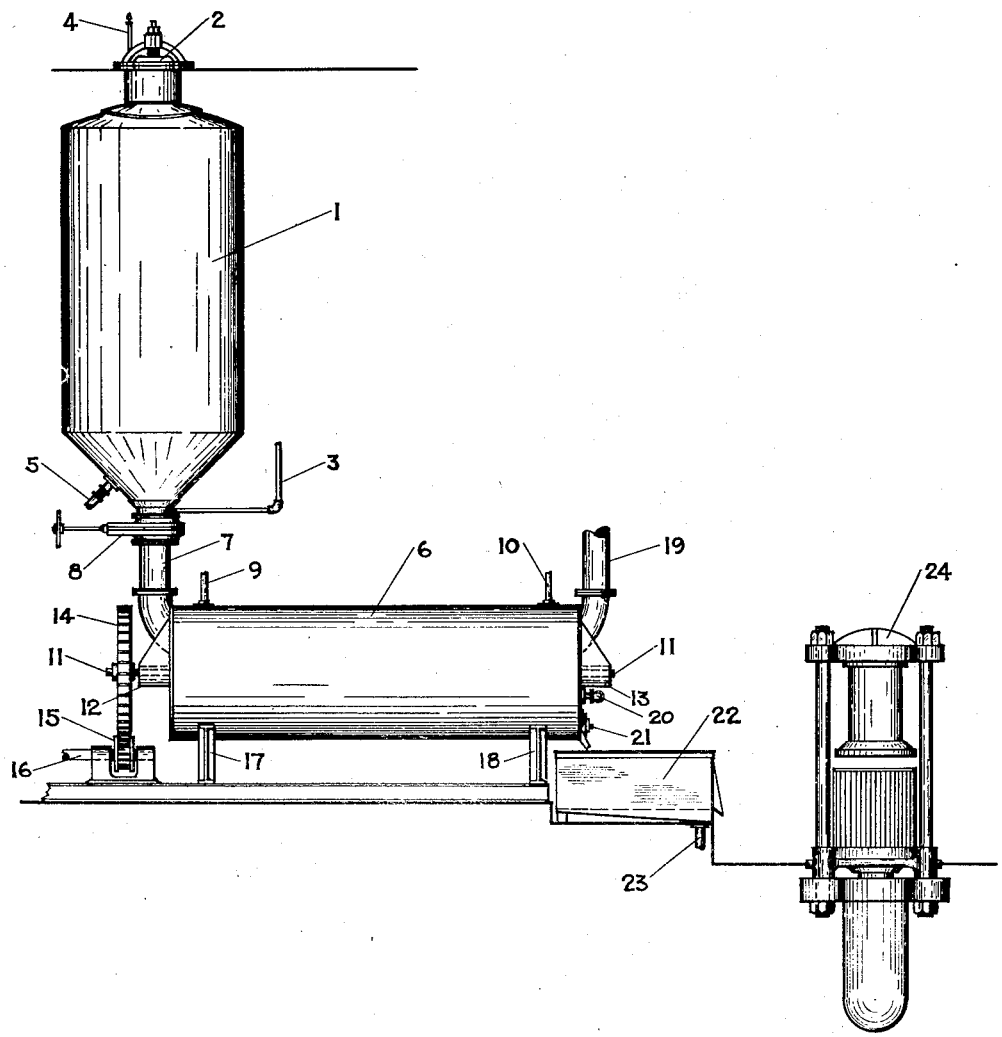
George McGilton
INVENTOR.
BY Roy W. Johns
ATTORNEY
WITNESS-
Wm. C. Meiser Patented Apr. 19, 1932

1,854,270

UNITED STATES PATENT OFFICE

GEORGE McGILTON, OF NEWARK, NEW JERSEY, ASSIGNOR, BY MESNE ASSIGNMENTS, TO INDUSTRIAL PATENTS CORPORATION, OF CHICAGO, ILLINOIS, A CORPORATION OF DELAWARE

RENDERING METHOD

Application filed November 6, 1930. Serial No. 493,734.

My invention relates to improved methods of rendering lard, grease, tallow, etc., from animal substances.

One of the objects of my invention is to produce a finished product of uniform quality, color and acid content.

Another object of my invention is to produce a crackling capable of being pressed to a lower grease content than heretofore known methods will permit.

Another object of my invention is the elimination of complex and mechanical equipment and highly technical supervision by furnishing a rendering method which can be satisfactorily operated under ordinary factory conditions with factory labor for the production of a high quality finished product.

In considering my invention, it would be advantageous to discuss methods of rendering formerly in use. There are two distinct rendering methods which have long been in favor, the wet method and the dry method.

What is sometimes known as a wet rendering process has been in use for many years in factory rendering operations. By this process, animal residue, such as trimmings, tripe, rennets, fat ends, gullets, cattle heads, diaphragms, etc., is placed in a large pressure vessel about 18 feet high and 7 feet in diameter, having a suitable opening, the vessel being filled approximately two-thirds full, and the charge being then cooked by the insertion of live steam at 40 pounds pressure per square inch for from 8 to 12 hours, depending on the type of the product. In some cases, water is added to supplement natural moisture. After cooking, the steam is turned off and the contents permitted to stand for about 4 hours, during which it divides itself into 3 parts by gravity, the heavy bodies commonly called "tankage," settling to the bottom, and the grease or tallow rising to the top is separated from the tankage by water. A valve in the side of the kettle is opened to withdraw the grease after which the water is drawn off into what are known as settling tanks for further skimming. A gate valve at the bottom of the tank is opened dropping the solid matter into a dump box from which the grease is recovered by skimming and the use of hydraulic presses.

The tankage resulting from the recovery of greases and tallows by the wet method, together with solids recovered by evaporating the water from the settling tanks after skimming, is pressed in a cake from about 1½ inches in thickness. The resultant cake is slightly inclined to crumble. This tankage in cake form is put in a horizontal cylinder heated by a steam jacket, and is agitated by means of a rotating horizontal shaft to which are affixed arms and paddles which rotate as the tankage is drying under the heat of the steam.

The dry method involves the cooking or drying of the fat containing substance to melt the fat and remove it from the animal tissue, much after the manner of the housewife who renders a little goose grease or leaf lard by long slow cooking in an open kettle on the kitchen stove.

I have found the dry rendering method unsatisfactory, because the long dry cooking required commonly results in a highly colored product, unless the cooking operations are very closely watched. A highly colored product is not desired because it ordinarily brings a lower price on the market.

By the dry rendering method, the product coming from the killing floors from which grease fats and tallows are to be rendered are placed in a cylindrical horizontal jacketed melter equipped with a rotary shaft to which are attached paddles or agitators. The melter may be provided with a valve for drawing off the grease or tallow. In practice, this melter is charged about one-half full of the raw material and the agitators are run at about 20 R. P. M. The material is heated for about 5½ hours, at the end of which time the entire contents of the melter are removed and placed on a large pan which contains a perforated bottom. The grease is allowed to drain off thru the perforations in the pan to the grease storage tanks. While the grease is draining off, an operation which requires a period of about one-half hour, the material on the perforated pan is kept hot by means of a steam jacketed bottom or closed steam coils in the bottom of the pan. After the grease is drained, the residue remaining, called "cracklings," is put into a hydraulic basket press formed by means of vertical bars placed about one-quarter inch apart, which allows the grease to pass thru freely as the material is subjected to pressure. This grease without further treatment passes directly to the grease storage tanks, though if desired, this grease which may contain some sediment may be washed. The residue from the press is a material very high in protein, which makes an excellent food for animals and poultry.

My method involves the use of less steam than in either of the dry or wet rendering processes, and the free fatty acid content of the tallow and grease made by the new process is less, so that the product brings a higher price on the market. In addition to this, the yield in tallow and grease is higher than the residue used for poultry and animal feed —not only contains a higher protein content, but has a better color than the residue resulting from either the old dry or wet method.

In practice, I deliver the raw product to an ordinary pressure vessel, and after the charging has been completed, admit steam thru a line entering in the bottom of the tank, until there is a decided blow-thru of vapor. The steam is then turned off and the separated accumulation of water drawn off; the tank is headed up and steam again introduced in sufficient quantity to raise the pressure to a point where the mucilaginous materials are either dissolved or congealed; the fibrous skin materials in the meantime are raised to a temperature where the breaking point of the various cellular structures has been or is readily accomplished. At this point pressure on the tank is relieved. The remaining charge is next transferred to a melter and the finishing of the rendering process is carried out by means of steam applied to the jacket of the melter, the vapors originating during the cooking or final rendering being allowed to escape to the atmosphere or condensed by means of vacuum producing equipment.

Due to the preparatory treatment in the rendering tank, the product is in such a physical state that it readily gives up its retained moisture and allows a quick separation of the tissue from the lard, grease or tallow. Upon completion of the drawing and melting operation, the free lard, grease or tallow, is drawn off into suitable receivers and the solid residual matter is dumped into a drain box for further draining prior to being pressed.

My method results in the benefit of both dry rendering and wet rendering without the shortcomings of either. I not only avoid the high color often resulting from dry rendering, but eliminate the danger of decomposition which is inherent in the wet method.

During manufacture by the wet method of rendering, the fats are accumulated in the presence of steam and water prior to rendering and are subjected to high temperatures and pressures and cooked for several hours in the presence of water and inert substances, which tend to act on the catalysts promoting the hydrolysis of the fats marked by splitting off of the fatty acids from the glycerides. Dry rendering is accomplished with much less danger of decomposition as it is marked by a quick handling of the raw fats. A speedy removal of water from the fats at a lower temperature and without pressure, so that the free fatty acids in the rendered fats are generally only about one-half as high as in corresponding wet rendering methods fats. It is thought also that immediate pressing of the practically dry residue resulting from dry rendering method insures a sound and dry and palatable product low in moisture, of sweet odor, low in fat, and high in ammonia, some authorities asserting that the ammonia saving of the dry method as against the wet method is about 15 to 20 per cent. The dry rendering appears to stop losses of ammonia which occur in wet method of rendering in the separating of the tank water in tankage, in tankage before drying, in handling and evaporating tank water, and in double drying of stick and tankage.

By my method, the danger of hydrolysis which occurs in the wet method is obviated because I do not cook for so long a time in the presence of water and inert substance, nor does my method result in the highly colored product so commonly produced by the dry method.

A typical layout for practicing my method is shown in the accompanying drawings which form a part of this specification. An ordinary pressure vessel or rendering tank, as 1, is charged with the raw product through the tank head manhole, 2. Steam is admitted through the steam line, 3, at the bottom of the tank until there is a decided blow-thru vapor which is indicated by the vent, 4. The steam is then turned off, the separated accumulation of water drawn off through the line, 5. The tank is headed up at 2, the steam again introduced through the line, 3, in sufficient quantity to raise the pressure as hereinbefore described. After the product has been sufficiently broken down, pressure on the tank is relieved through the vent, 4. The charge is next transferred from the rendering tank, 1, to a melter, 6, by way of line, 7, controlled by valve, 8. The melter, 6, is provided with a jacket in which steam is introduced through lines, 9 and 10. The melter is equipped with agitators operated by the shaft, 11, journalled at 12 and 13. The shaft, 11, is rotated by gear, 14, which meshes with gear, 15, mounted on driveshaft, 16. The melter is provided with appropriate supports, as 17 and 18. Vapors produced during the cooking or final rendering in the melter are drawn off through line, 19.

Upon completion of the melting operation, the free lard, grease, or tallow is drawn off through the valve, 20, into suitable receivers and the solid residual matter remaining in the melter is dumped through door, 21, into a steam jacketed drain box, as 22, for further draining. Free lard, grease, or tallow is drawn off from drain box, 22, by line, 23, to suitable receivers. A suitable press, as 24, is used to extract any grease remaining in the cracklings, after removing from drain box, 22.

It is to be understood that changes may be made in the type of equipment used and in the various steps of the process without departing from the spirit of my invention, as defined in the following claim.

I claim:

The method of rendering lard, grease, tallow, etc. from animal substances which consists in passing steam through and in contact with the material until the latter is thoroughly heated, then shutting off the steam and drawing off accumulated water, then subjecting the mass to steam under pressure to separate the mucilaginous matter and break down the cellular structure, then applying dry heat to drive off vapors and moisture and effect separation of the fat, then drawing off the fat and maintaining the solid mass at a temperature to facilitate separation of the fat, and finally subjecting the solid mass to pressure to remove any oil.

Signed at Kearny, New Jersey, this first day of November, A. D. 1930.

GEORGE McGILTON.